United States Patent
Zook et al.

(10) Patent No.: US 7,687,578 B2
(45) Date of Patent: Mar. 30, 2010

(54) SEALANTS AND POTTING FORMULATIONS INCLUDING MERCAPTO-TERMINATED POLYMERS PRODUCED BY THE REACTION OF A POLYTHIOL AND POLYVINYL ETHER MONOMER

(75) Inventors: Jonathan D. Zook, Santa Clarita, CA (US); Susan E. DeMoss, Van Nuys, CA (US); David W. Jordan, Northridge, CA (US); Chandra B. Rao, Valencia, CA (US); Hakam Singh, Bradbury, CA (US); Ahmed Sharaby, Canyon Country, CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 1444 days.

(21) Appl. No.: 10/644,389

(22) Filed: Aug. 19, 2003

(65) Prior Publication Data
US 2004/0039121 A1 Feb. 26, 2004

Related U.S. Application Data

(60) Continuation of application No. 10/302,177, filed on Nov. 21, 2002, now abandoned, which is a continuation of application No. 09/756,573, filed on Jan. 8, 2001, now Pat. No. 6,509,418, which is a continuation-in-part of application No. 08/928,972, filed on Sep. 12, 1997, now Pat. No. 6,172,179, which is a continuation-in-part of application No. 08/802,130, filed on Feb. 19, 1997, now Pat. No. 5,912,319, application No. 10/644,389, which is a continuation-in-part of application No. 09/318,500, filed on May 25, 1999, now Pat. No. 6,232,401, which is a division of application No. 08/802,130, filed on Feb. 19, 1997, now Pat. No. 5,912,319.

(60) Provisional application No. 60/215,548, filed on Jun. 30, 2000, provisional application No. 60/182,396, filed on Feb. 14, 2000.

(51) Int. Cl.
C08L 41/00 (2006.01)
C08G 75/00 (2006.01)

(52) U.S. Cl. ............... 525/212; 525/328.5; 525/329.9; 528/373; 528/374; 528/378; 568/29

(58) Field of Classification Search ............ 528/373, 528/374, 378; 525/242, 328.5, 329.9, 212; 568/29

See application file for complete search history.

(56) References Cited

U.S. PATENT DOCUMENTS

| 2,466,963 A | 4/1949 | Patrick et al. |
|---|---|---|
| 3,312,743 A | 4/1967 | Schmelzer et al. |
| 3,331,818 A | 7/1967 | Bertozzi |
| 3,335,189 A | 8/1967 | Degener et al. |

(Continued)

FOREIGN PATENT DOCUMENTS

| EP | 0 552 550 A2 | 4/1993 |
|---|---|---|
| JP | 74028916 | 7/1974 |
| JP | 63273646 A | 11/1988 |
| JP | 02000128857 A | 5/2000 |

OTHER PUBLICATIONS

Klemm, E. et al., 1991, J. Macromol. Sci-Chem, A28(9), 875-883.
Nuyken, O. et al., 1990, Makromol, Chem., Rapid Commun. 11, 365-373.

(Continued)

*Primary Examiner*—Duc Truong
(74) *Attorney, Agent, or Firm*—Finnegan, Henderson, Farabow, Garrett & Dunner, LLP

(57) ABSTRACT

Sealant and potting formulations are provided which are prepared from components including ungelled mercapto-terminated polymer(s) prepared by reacting reactants comprising polyvinyl ether monomer(s) and polythiol material(s); curing agent(s) reactive with a mercapto group of the mercapto-terminated polymer; and additive(s) selected from the group consisting of fillers, adhesion promoters, plasticizers and catalysts.

20 Claims, 2 Drawing Sheets

U.S. PATENT DOCUMENTS

| | | | |
|---|---|---|---|
| 3,506,626 | A | 4/1970 | Warner et al. |
| 3,697,402 | A | 10/1972 | Kehr et al. |
| 3,697,622 | A | 10/1972 | Kehr et al. |
| 3,725,229 | A | 4/1973 | Kehr et al. |
| 3,734,968 | A | 5/1973 | Hickner |
| 3,740,375 | A | 6/1973 | Novak |
| 3,763,124 | A | 10/1973 | Edmonds, Jr. |
| 3,862,922 | A | 1/1975 | Signouret et al. |
| 4,255,561 | A | 3/1981 | Wood et al. |
| 4,263,078 | A | 4/1981 | Millen et al. |
| 4,366,307 | A | 12/1982 | Singh et al. |
| 4,609,762 | A | 9/1986 | Morris et al. |
| 5,225,472 | A | 7/1993 | Cameron et al. |
| 5,231,150 | A | 7/1993 | McGrail et al. |
| 5,516,455 | A | 5/1996 | Jacobine et al. |
| 5,574,127 | A | 11/1996 | Sau |
| 5,663,219 | A | 9/1997 | Chokshi et al. |
| 5,912,319 | A | 6/1999 | Zook et al. |
| 5,959,071 | A | 9/1999 | DeMoss et al. |
| 6,172,179 | B1 | 1/2001 | Zook et al. |
| 6,232,401 | B1 | 5/2001 | Zook et al. |
| 6,372,849 | B2 | 4/2002 | DeMoss et al. |
| 6,486,269 | B2 | 11/2002 | Zook et al. |
| 6,486,297 | B2 | 11/2002 | Zook et al. |
| 6,509,418 | B1 | 1/2003 | Zook et al. |
| 6,525,168 | B2 | 2/2003 | Zook et al. |
| 2002/0013450 | A1 | 1/2002 | Zook et al. |
| 2003/0130480 | A1 | 7/2003 | Zook et al. |

OTHER PUBLICATIONS

Ameduri, B. et al., 1991, Polymer Bulletin 26, 377-382.
Klemm, E. et al., 1985, Chemical Abstracts 103:197058z.
Yamaguchi, K. et al., 1973, Polymer, 14:87-90.
Marvel, C. et al., J. Pol. Sci., 6(6):711-716.
Marvel, C. et al., J. Pol. Sci., 8(3):313-320.
Cai, G. et al., Synthesis of Polythioether Ethers from Diallyl Ether.
Nuyken, O. et al., 1991, Makromol. Chem. 192, 1959-1968.
Nuyken, O. et al., 1981, Polymer Bulletin 4, 61-65.
Chemical Abstracts Selects: 1992, Novel Polymers from Patents, Issue 7, 116:107048n; 1970.
Warner et al., Organic Sulfur Polymers,112186x.
Abstract of U.S. Patent No. 2,664,414, Dec. 29, 1953.
Klemm, E. et al., 1987, Chem., 27Jg, 4:145-146.
Klemm, E. et al., 1992, Polymer Bulletin 28, 653-656.
Nuyken, O. et al., 1984, Polymer Bulletin 11, 165-170.
Organic Sulfur Chemistry: Structure & Mechanism, 408-410 and 418.
Klemm, E. et al., 1990, Makromol. Chem. 191, 2403-2411.
Nuyken, O. et al., "Dimercapto Telechelics by Polyaddition of Diothiols onto Diolefines", 197-198.
Musorin, G.K. et al., 1991, "A simple Synthesis of 2-Methyl-1, 4-Dithiacycloheptane from diallyl Sulfide and Hydrogen Sulfide," Plenum Publishing Corporation, 2423.
Haucourt, Nancy H., 1994, Macromolecules, 27:1329-1333.
Tarasiuk, B. et al., "Products of polycondensation of 4,4'-biphenyl-dithiol with some hydrocarbon dihalides", Die Angewandte Makromolekulare Chemie, vol. 251, No. 4276, pp. 13-21 (1997).

US 7,687,578 B2

SEALANTS AND POTTING FORMULATIONS INCLUDING MERCAPTO-TERMINATED POLYMERS PRODUCED BY THE REACTION OF A POLYTHIOL AND POLYVINYL ETHER MONOMER

CROSS-REFERENCE TO RELATED APPLICATIONS

This application is a continuation of U.S. patent application Ser. No. 10/302,177, filed Nov. 21, 2002, now abandoned; which is a continuation of U.S. patent application Ser. No. 09/756,573, filed Jan. 8, 2001, now U.S. Pat. No. 6,509,418 B1; which is a continuation-in-part of U.S. patent application Ser. No. 08/928,972, filed Sep. 12, 1997, now U.S. Pat. No. 6,172,179; which is a continuation-in-part of U.S. patent application Ser. No. 08/802,130, filed on Feb. 19, 1997, now U.S. Pat. No. 5,912,319; said U.S. patent application Ser. No. 09/756,573 is also a continuation-in-part of U.S. patent application Ser. No. 09/318,500, filed May 25,1999, now U.S. Pat. No. 6,232,401; which is a division of said U.S. patent application Ser. No. 08/802,130, filed on Feb. 19, 1997, now U.S. Pat. No. 5,912,319; and said U.S. patent application Ser. No. 09/756,573 claims the benefit of U.S. Provisional Application No. 60/182,396, filed Feb. 14, 2000, and U.S. Provisional Application No. 60/215,548, filed Jun. 30, 2000, all of which are incorporated herein by reference.

FIELD OF THE INVENTION

The present invention relates to a sealant or potting formulation prepared from a mercapto-terminated polymer produced by the reaction of polythiol(s) and polyvinyl ether monomer(s), the formulation having good low temperature flexibility and fuel resistance.

BACKGROUND OF THE INVENTION

Commercially available polymeric materials which have sufficient sulfur content to exhibit desirable sealing and fuel resistance properties for aerospace sealants and electrical potting compounds are the polysulfide polyformal polymers described, e.g., in U.S. Pat. No. 2,466,963, and the alkyl side chain containing polythioether polyether polymers described, e.g., in U.S. Pat. No. 4,366,307 to Singh et al. Materials useful in this context also have the desirable properties of low temperature flexibility characterized by a low glass transition temperature ($T_g$) and liquidity at room temperature.

An additional desirable combination of properties for aerospace sealants which is much more difficult to obtain is the combination of long application time (i.e., the time during which the sealant remains usable) and short curing time (the time required to reach a predetermined strength). Singh et al., U.S. Pat. No. 4,366,307, disclose such materials. Singh et al. teach the acid-catalyzed condensation of hydroxyl-functional thioethers. The hydroxyl groups are in the β-position with respect to a sulfur atom for increased condensation reactivity. The Singh et al. patent also teaches the use of such hydroxyl-functional thioethers with pendant methyl groups to afford polymers having good flexibility and liquidity. However, the disclosed condensation reaction has a maximum yield of about 75% of the desired condensation product. Furthermore, the acid-catalyzed reaction of β-hydroxysulfide monomers yields significant quantities of an aqueous solution of thermally stable and highly malodorous cyclic byproducts, such as 1-thia-4-oxa-cyclohexane which limits the suitable application of the disclosed polymers.

Another desirable feature in polymers suitable for use in aerospace sealants is high temperature resistance. While incorporating sulfur to carbon bonds into a polymer generally enhances high temperature performance, the polysulfide polyformal polymers disclosed in U.S. Pat. No. 2,466,963 have multiple —S—S— linkages in the polymer backbones which result in compromised thermal resistance. In the polymers of Singh et al., U.S. Pat. No. 4,366,307, enhanced thermal stability is achieved through replacement of polysulfide linkages with polythioether (—S—) linkages. However, the thermal resistance of these polythioethers is limited as a result of residual acid condensation catalyst.

Morris et al., U.S. Pat. No. 4,609,762, describes reacting dithiols with secondary or tertiary alcohols to afford liquid polythioethers having no oxygen in the polymeric backbone. Cured polymeric materials formed from these polymers have the disadvantage, however, of reduced fuel resistance due to the large number of pendant methyl groups that are present. In addition, the disclosed process generates undesirable aqueous acidic waste.

Cameron, U.S. Pat. No. 5,225,472, discloses production of polythioether polymers by the acid-catalyzed condensation of dithiols with active carbonyl compounds such as HCOOH. Again, this process generates undesirable aqueous acidic waste.

The addition polymerization of aromatic or aliphatic dithiols with diene monomers has been described in the literature. See, e.g., Klemm, E. et al., *J. Macromol. Sci.-Chem.*, A28(9), pp. 875-883 (1991); Nuyken, O. et al., *Makromol. Chem., Rapid Commun.* 11, 365-373 (1990). However, neither Klemm et al. nor Nuyken suggest selection of particular starting materials to form a polymer that is liquid at room temperature and, upon curing, has excellent low-temperature flexibility (low $T_g$) and high resistance to fuels, i.e., hydrocarbon fluids. Nor do Klemm et al. suggest production of a polymer that also is curable at room or lower temperatures. Moreover, the reactions disclosed by Klemm et al. also generate undesirable cyclic byproducts.

There exists a need in the art for sealant, coating and electrical potting formulations or compositions that can provide good pot life as well as good performance properties, such as fuel resistance, flexural strength, thermal resistance and longevity in use.

SUMMARY OF THE INVENTION

The present invention provides a sealant or potting formulation prepared from components comprising (a) at least one ungelled mercapto-terminated polymer prepared by reacting reactants comprising at least one polyvinyl ether monomer and at least one polythiol material; (b) at least one curing agent reactive with a mercapto group of the mercapto-terminated polymer; and (c) at least one additive selected from the group consisting of fillers, adhesion promoters, plasticizers and catalysts.

Another aspect of the present invention is a sealant or potting formulation prepared from components comprising: (a) at least one ungelled mercapto-terminated polymer prepared from reactants comprising diethylene glycol divinyl ether and dimercapto dioxaoctane; (b) at least one curing agent reactive with a mercapto group of the mercapto-terminated polymer; and (c) at least one additive selected from the group consisting of fillers, adhesion promoters, plasticizers and catalysts.

The above sealant formulations are useful in a variety of applications, such as for example aerospace applications or as electrical potting compounds.

Other than in the operating examples, or where otherwise indicated, all numbers expressing quantities of ingredients, reaction conditions, and so forth used in the specification and claims are to be understood as being qualified in all instances by the term "about". Also, as used herein, the term "polymer" is meant to refer to oligomers, homopolymers and copolymers.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
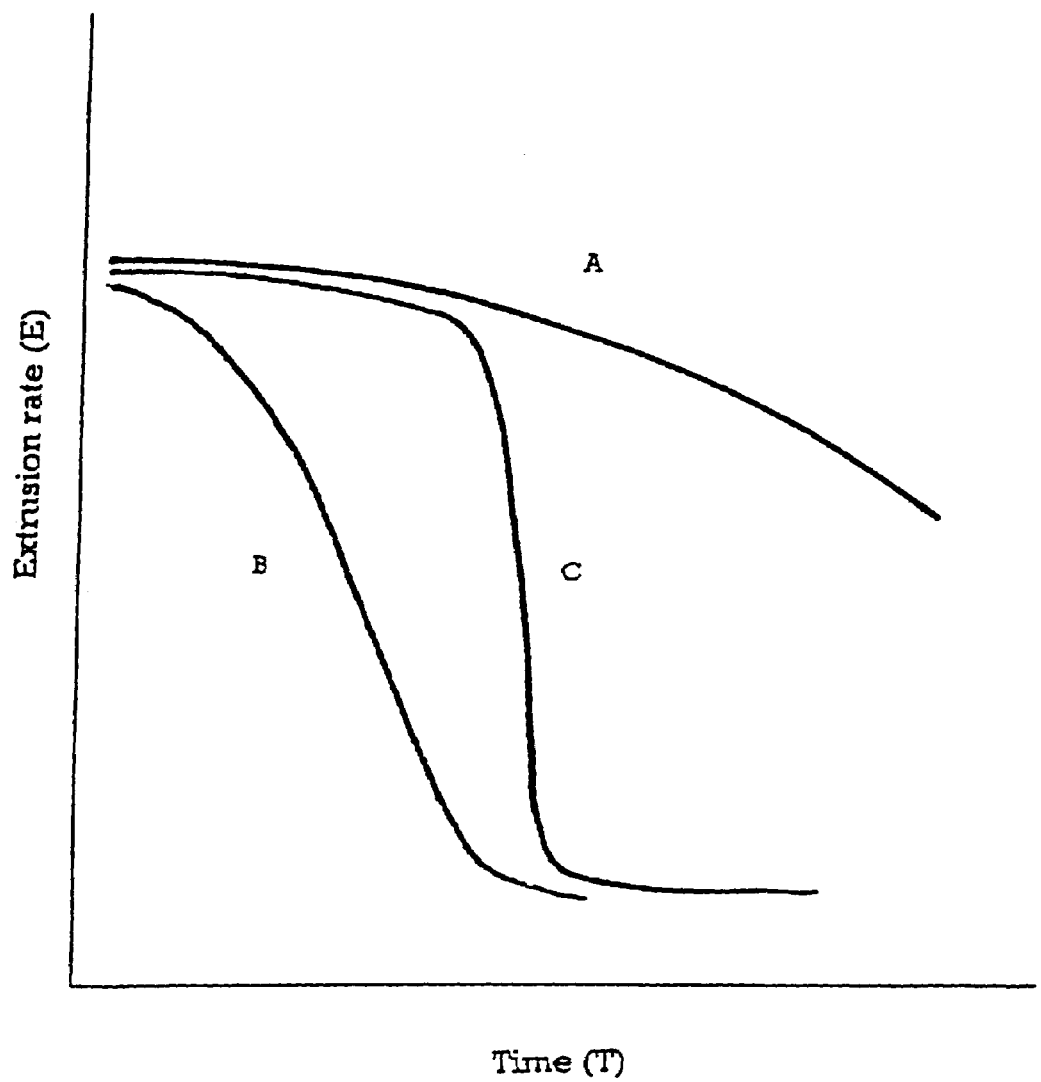
FIG. 1 depicts linear graphs of extrusion rate (E) versus time (T) for sealant compositions of the invention in comparison to extrusion rate curves for known-types of sealant composition.

The sealant and potting formulations of the present invention comprise one or more ungelled mercapto-terminated polymers or polythioethers. It has surprisingly been discovered that polythioethers prepared from the combination of polythiol(s) with polyvinyl ether monomer(s) according to the present invention result in ungelled mercapto-terminated polymers that are liquid at room temperature and pressure and that have desirable physical and rheological properties, and that furthermore are substantially free of malodorous cyclic by-products. The inventive materials also are substantially free of deleterious catalyst residues, and have superior thermal resistance properties.

The mercapto-terminated polymers useful in the sealant and potting formulations of the present invention are preferably liquid at room temperature and pressure and cured sealants including such polymers have excellent low temperature flexibility and fuel resistance. As used herein, the term "room temperature and pressure" denotes conditions of approximately 77° F. (25° C.) and 1 atmosphere (760 mm Hg) pressure.

The mercapto-terminated polymer is ungelled or substantially free of crosslinking. By "ungelled" is meant that the mercapto-terminated polymer is substantially free of crosslinking and has an intrinsic viscosity when dissolved in a suitable solvent, as determined, for example, in accordance with ASTM-D1795 or ASTM-D4243. The intrinsic viscosity of the mercapto-terminated polymer is an indication of its finite molecular weight. A gelled reaction product, on the other hand, since it is of essentially infinitely high molecular weight, will have an intrinsic viscosity too high to measure.

Preferably, the mercapto-terminated polymer has a glass transition temperature ($T_g$) that is not higher than −50° C., more preferably not higher than −55° C. and most preferably not higher than −60° C. Generally, it is preferred that the glass transition temperature of the mercapto-terminated polymer ranges from −85° C. to −50° C., and more preferably −70° C. to −50° C., as determined by differential scanning calorimetry (DSC).

Low temperature flexibility can be determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88, which are incorporated herein by reference. Cured formulations having good low temperature flexibility are desirable in aerospace applications because the formulations are subjected to wide variations in environmental conditions, such as temperature and pressure, and physical conditions such as joint contraction and expansion and vibration.

An advantage of the formulations of the present invention is that they exhibit very desirable fuel resistance characteristics when cured, due at least in part to the use of the mercapto-terminated polymers discussed herein. The fuel resistance of a cured sealant can be determined by percent volume swell after prolonged exposure of the cured sealant to a hydrocarbon fuel, which can be quantitatively determined using methods similar to those described in ASTM D792 or AMS 3269, which are incorporated herein by reference. For fuel resistance testing, the cured sealant can be prepared from 100 parts by weight of mercapto-terminated polymer, 50 parts by weight of precipitated calcium carbonate and an epoxy curing agent in a 1:1 equivalent ratio of mercapto groups to epoxy groups. The epoxy curing agent is prepared from a 60:40 weight ratio of EPON 828 bisphenol A diglycidyl ether (available from Shell Chemical) to DEN 431 bisphenol A novolac resin (available from Dow Chemical).

In a preferred embodiment, the cured sealants of the present invention have a percent volume swell not greater than 40%, and preferably not greater than 25% after immersion for one week at 140° F. (60° C.) and ambient pressure in jet reference fluid (JRF) type 1. More preferably, the percent volume swell of the cured polymers is not greater than 20%, and more preferably ranges from zero to 20%. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |
| Tertiary butyl mercaptan | 0.015% ± 0.0015 by weight of the other four components |

Preferably, the ungelled mercapto-terminated polymers have a number average molecular weight ranging from about 500 to about 20,000 grams per mole, more preferably from about 1,000 to about 10,000, and most preferably from about 2,000 to about 5,000, the molecular weight being determined by gel-permeation chromatography using a polystyrene standard.

Liquid mercapto-terminated polymers within the scope of the present invention can be difunctional, that is, linear polymers having two end groups, or polyfunctional, that is, branched polymers having three or more end groups.

The mercapto-terminated polymers are prepared by reacting reactants comprising one or more polyvinyl ether monomers and one or more polythiol materials. Useful polyvinyl ether monomers include divinyl ethers having the formula (V):

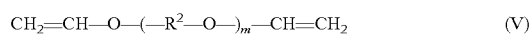

where $R^2$ is $C_{2-6}$ n-alkylene, $C_2$-branched alkylene, $C_{6-8}$ cycloalkylene or $C_{6-10}$ alkylcycloalkylene group or $-[(CH_2-)_p-O-]_q-(-CH_2-)_r-$ and m is a rational number ranging from 0 to 10, p is an independently selected integer ranging from 2 to 6, q is an independently selected integer ranging from 1 to 5 and r is an independently selected integer ranging from 2 to 10.

The materials of formula V are divinyl ethers. Such divinyl ether monomers as described herein can provide polymers having superior fuel resistance and low temperature performance as compared to prior art polymers prepared from alkenyl ether and conjugated dienes such as 1,3 butadiene copolymerized with a dithiol such as DMDS. Divinyl ether (m=0) is operative herein. Preferred divinyl ethers include those compounds having at least one oxyalkylene group, more preferably from 1 to 4 oxyalkylene groups such as those compounds in which m is an integer from 1 to 4. More preferably, m is an integer from 2 to 4. It is also possible to employ commercially available divinyl ether mixtures in producing mercapto-terminated polymers according to the invention. Such mixtures are characterized by a non-integral-average value for the number of alkoxy units per molecule. Thus, m in formula V can also take on rational number values between 0 and 10.0; preferably between 1.0 and 10.0; very preferably between 1.0 and 4.0, particularly between 2.0 and 4.0.

Suitable polyvinyl ether monomers include divinyl ether monomers, such as divinyl ether, ethylene glycol divinyl ether (EG-DVE) ($R^2$=ethylene, m=1), butanediol divinyl ether (BD-DVE) ($R^2$=butylene, m=1), hexanediol divinyl ether (HD-DVE) ($R^2$=hexylene, m=1), diethylene glycol divinyl ether (DEG-DVE) ($R^2$=ethylene, m=2) (preferred), triethylene glycol divinyl ether ($R^2$=ethylene, m=3), tetraethylene glycol divinyl ether ($R^2$=ethylene, m=4), cyclohexanedimethanol divinyl ether, polytetrahydrofuryl divinyl ether; trivinyl ether monomers such as trimethylolpropane trivinyl ether, tetrafunctional monomers such as pentaerythritol tetravinyl ether and mixtures thereof. The polyvinyl ether material can have one or more pendant groups selected from alkyl groups, hydroxyl groups, alkoxy groups and amine groups.

Useful divinyl ethers in which $R^2$ is $C_{2-6}$-branched alkylene can be prepared by reacting a polyhydroxy compound with acetylene. Exemplary compounds of this type include compounds in which $R^2$ is an alkyl-substituted methylene group such as $-CH(CH_3)-$ (for example "PLURIOL®" blends such as PLURIOL® E-200 divinyl ether (BASF Corp. of Parsippany, N.J.), for which $R^2$=ethylene and m=3.8) or an alkyl-substituted ethylene (for example $-CH_2CH(CH_3)-$ such as "DPE" polymeric blends including DPE-2 and DPE-3 (International Specialty Products of Wayne, N.J.)).

Other useful divinyl ethers include fluorinated compounds or compounds in which $R^2$ is polytetrahydrofuryl (poly-THF) or polyoxyalkylene, preferably having an average of about 3 monomer units.

Two or more polyvinyl ether monomers of the formula V can be used in the foregoing method. Thus in preferred embodiments of the invention, two polythiols of formula IV (discussed below) and one polyvinyl ether monomer of formula V, one polythiol of formula IV and two polyvinyl ether monomers of formula V, two polythiols of formula IV and two polyvinyl ether monomers of formula V, and more than two compounds of one or both formulas, can be used to produce a variety of polymers according to the invention, and all such combinations of compounds are contemplated as being within the scope of the invention.

Generally, the polyvinyl ether monomer comprises 20 to less than 50 mole percent of the reactants used to prepare the mercapto-terminated polymer, and preferably 30 to less than 50 mole percent.

Suitable polythiol materials for preparing the mercapto-terminated polymer include compounds, monomers or polymers having at least two thiol groups. Useful polythiols include dithiols having the formula (IV):

$$HS-R^1-SH \qquad (IV)$$

where $R^1$ can be a $C_{2-6}$ n-alkylene group; $C_{3-6}$ branched alkylene group, having one or more pendant groups which can be, for example, hydroxyl groups, alkyl groups such as methyl or ethyl groups; alkoxy groups, $C_{6-8}$ cycloalkylene; $C_{6-10}$ alkylcycloalkylene group; $-[(-CH_2-)_p-X]_q-(-CH_2-)_r-$; or $-[(-CH_2-)_p-X]_q-(-CH_2-)_r-$ in which at least one $-CH_2-$ unit is substituted with a methyl group and in which p is an independently selected integer ranging from 2 to 6, q is an independently selected integer ranging from 1 to 5 and r is an independently selected integer ranging from 2 to 10.

Further preferred dithiols include one or more heteroatom substituents in the carbon backbone, that is, dithiols in which X includes a heteroatom such as O, S or another bivalent heteroatom radical; a secondary or tertiary amine group, i.e., $-NR^6-$, where $R^6$ is hydrogen or methyl; or another substituted trivalent heteroatom. In a preferred embodiment, X is O or S, and thus $R^1$ is $-[(-CH_2-)_p-O-]_q-(-CH_2-)_r-$ or $[(-CH_2-)_p-S-]_q-(-CH_2-)_r-$. Preferably, p and r are equal, and most preferably both have the value of 2.

Useful polythiols include but are not limited to dithiols such as 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. The polythiol material can have one or more pendant groups selected from lower alkyl groups, lower alkoxy groups and hydroxyl groups. Suitable alkyl pendant groups include $C_1$-$C_6$ linear alkyl, $C_3$-$C_6$ branched alkyl, cyclopentyl, and cyclohexyl.

Preferred dithiols include dimercaptodiethylsulfide (DMDS) (p=2, r=2, q=1, X=S); dimercaptodioxaoctane (DMDO) (p=2, q=2, r=2, X=O); and 1,5-dimercapto-3-oxapentane (p=2, r=2, q=1, X=O). It is also possible to use dithiols that include both heteroatom substituents in the carbon backbone and pendant alkyl groups, such as methyl groups. Such compounds include methyl-substituted DMDS, such as $HS-CH_2CH(CH_3)-S-CH_2CH_2-SH$, $HS-CH(CH_3)CH_2-S-CH_2CH_2-SH$ and dimethyl substituted DMDS such as $HS-CH_2CH(CH_3)-S-CH(CH_3)CH_2-SH$ and $HS-CH(CH_3)CH_2-S-CH_2CH(CH_3)-SH$.

Two or more different polythiols can be used if desired to prepare useful polythioethers.

Preferably, the polythiol material has a number average molecular weight ranging from 90 to 1000 grams per mole, and more preferably 90 to 500 grams per mole.

Relative amounts of dithiol and divinyl ether materials used to prepare the polymers are chosen to yield terminal mercapto groups (—SH). These mercaptan-terminated polymers can include thiol terminal groups that are not further reacted ("uncapped"), or include one or more thiol groups that are further reacted with other materials to provide reactive or non-reactive terminal or pendant groups ("capped"). Capping the polymers of the present invention enables introduction of additional terminal functionalities, for example, hydroxyl or amine groups, to the polymers, or in the alternative, introduction of end groups that resist further reaction, such as terminal alkyl groups. Preferably, the stoichiometric ratio of polythiol to divinyl ether materials is less than one equivalent of polyvinyl ether to one equivalent of polythiol, resulting in mercapto-terminated polymers. More preferably, the stoichiometric ratio is selected to fully terminate the polymer with mercapto groups.

Hydroxyl- or amino-functional terminal polymers can be produced, for example, by reacting a vinyl terminated material with mercaptoalcohols such as 3-mercaptopropanol or mercaptoamines such as 4-mercaptobutylamine, respectively, or by reacting a mercaptan terminated material with a vinyl terminated material having hydroxyl functionality such as butane diol monovinyl ether or amine functionality such as aminopropyl vinyl ether.

Preferably, the mercapto-terminated polymer comprises 30 to 90 weight percent of the sealant formulation on a basis of total weight of the sealant formulation, and more preferably 30 to 60 weight percent.

The reactants from which the mercapto-terminated polymers are prepared can further comprise one or more free radical catalysts. Preferred free radical catalysts include azo compounds, for example azobis-nitrile compounds such as azo(bis)isobutyronitrile (AIBN); organic peroxides such as benzoyl peroxide and t-butyl peroxide; inorganic peroxides and similar free-radical generators. The reaction can also be effected by irradiation with ultraviolet light either with or without a cationic photoinitiating moiety. Ionic catalysis methods, using either inorganic or organic bases, e.g., triethylamine, also yield materials useful in the context of this invention.

Mercapto-terminated polymers within the scope of the present invention can be prepared by a number of methods. According to a first preferred method, (n+1) moles of a material having the formula IV:

HS—R$^1$—SH          (IV)

or a mixture of at least two different compounds having the formula IV, are reacted with n moles of a material having the formula V:

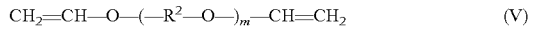

CH$_2$=CH—O—(—R$^2$—O—)$_m$—CH=CH$_2$          (V)

or a mixture of at least two different compounds having the formula V, in the presence of a catalyst. This method provides an uncapped, mercapto-terminated difunctional polymer.

Although, as indicated above, compounds of the formulas IV and V which have pendant alkyl groups, for example pendant methyl groups, are useful according to the invention, it has surprisingly been discovered that compounds of the formulas IV and V which are free of pendant methyl or other alkyl groups also afford mercapto-terminated polymers that are ungelied at room temperature and pressure.

Capped analogs to the foregoing mercapto-terminated polymers can be prepared by reacting a material having the formula IV or a mixture of at least two different compounds having the formula IV and a material having the formula V or a mixture of at least two different compounds having the formula V in a stoichiometric ratio of less than one equivalent of dithiol per vinyl equivalent of formula V, with about 0.05 to about 2 moles of a material having the formula VI

CH$_2$=CH—(CH$_2$)$_s$—O—R$^5$          (VI)

or a mixture of two different materials having the formula VI, in the presence of an appropriate catalyst.

Materials of the formula VI are alkyl ω-alkenyl ethers having a terminal ethylenically unsaturated group which react with terminal thiol groups to cap the polythioether polymer.

In formula VI, s is an integer from 0 to 10, preferably 0 to 6, more preferably 0 to 4 and R$^5$ is an unsubstituted or substituted alkyl group, preferably a C$_{1-6}$ n-alkyl group which can be substituted with at least one —OH or —NHR$^7$ group, with R$^7$ denoting H or C$_{1-6}$ alkyl. Exemplary useful R$^5$ groups include alkyl groups, such as ethyl, propyl and butyl; hydroxyl-substituted groups such as 4-hydroxybutyl; amine substituted groups such as 3-aminopropyl; etc.

Specific preferred materials of the formula VI are monovinyl ethers (s=0), including amino- and hydroxyalkyl vinyl ethers, such as 3-aminopropyl vinyl ether and 4-hydroxybutyl vinyl ether (butanediol monovinyl ether), as well as unsubstituted alkyl vinyl ethers such as ethyl vinyl ether. Additional preferred materials of the formula VI include allyl ethers (s=1), such as 4-aminobutyl allyl ether, 3-hydroxypropyl allyl ether, etc. Although materials in which s is greater than 6 can be used, the resulting polymers may have less fuel resistance than those in which s is 6 or less.

Use of equivalent amounts of materials of the formula VI relative to thiol groups present in formula IV provides fully capped mercapto polymers, while use of lesser amounts results in partially capped polymers.

Preferably, an equivalent of polyvinyl ether is reacted with dithiol or a mixture of polythiols.

A preferred linear structured mercapto-terminated polymer useful in the sealant and potting formulations of the present invention has the structure of formula (I):

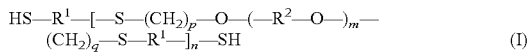

HS—R$^1$—[—S—(CH$_2$)$_p$—O—(—R$^2$—O—)$_m$—(CH$_2$)$_q$—S—R$^1$—]$_n$—SH          (I)

wherein

R$^1$ denotes a C$_{2-10}$ n-alkylene, C$_{2-6}$ branched alkylene, C$_{6-8}$ cycloalkylene or C$_{6-10}$ alkylcycloalkylene group, heterocyclic, —[(—CH$_2$)$_p$—X]$_q$—(—CH$_2$)$_r$—; or —[(—CH$_2$)$_p$—X]$_q$—(—CH$_2$)$_r$— in which at least one —CH$_2$— unit is substituted with a methyl group;

R$^2$ denotes a C$_{2-10}$ n-alkylene, C$_{2-6}$ branched alkylene, C$_{6-8}$ cycloalkylene or C$_{6-14}$ alkylcycloalkylene group, heterocyclic, —[(—CH$_2$)$_p$—X]$_q$—(—CH$_2$)$_r$—;

X denotes one selected from the group consisting of O, S and —NR$^6$—;

R$^6$ denotes H or methyl;

m is an independently selected rational number from 1 to 50; and n is an independently selected integer from 1 to 60;

p is an independently selected integer ranging from 2 to 6;

q is an independently selected integer ranging from 1 to 5; and r is an independently selected integer from 2 to 10.

In a more preferred embodiment of the foregoing polymer, R$^1$ is C$_2$-C$_6$ alkyl and R$^2$ is C$_2$-C$_6$ alkyl.

In a preferred embodiment, the polythioether has the formula (II):

A-(—[R$^3$]$_y$—R$^4$)$_2$          (II)

wherein

A denotes a structure having the formula I, y is 0 or 1,

R$^3$ denotes a single bond when y=0 and —S—(CH$_2$)$_2$—[—O—R$^2$—]$_m$—O— when y=1, $R^4$ denotes —SH or —S—(—CH$_2$—)$_2$—S—O—R$^5$ when y=0 and —CH=CH$_2$ or —(CH$_2$—)$_2$—S—R$^5$ when y=1,
s is an integer from 0 to 10,
$R^5$ denotes $C_{1-6}$ alkyl group which is unsubstituted or substituted with at least one —OH or —NHR$^7$ group, and
$R^7$ denotes H or a $C_{1-6}$ n-alkyl group.

Thus, polythioethers of the formula II are linear, difunctional polymers which can be uncapped or capped. When y=0, the polymer includes terminal thiol groups or capped derivatives thereof. In an alternative embodiment, when y=1 (not preferred), the polymer includes terminal vinyl groups or capped derivatives thereof.

According to a preferred embodiment, the inventive polythioether is a difunctional thiol-terminated (uncapped) polythioether. That is, in formula II, y=0 and R$^4$ is —SH. Thus, the polythioether has the following structure:

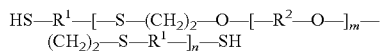

In a preferred embodiment, R$^1$=—[(—CH$_2$)$_p$—X]$_q$—(—CH$_2$)$_r$—, where p=2, X=O, q=2 and r=2, R$^2$ is ethylene group, m=2 and n is about 9.

The foregoing polymers are produced, for example, by reacting a divinyl ether or mixture thereof with an excess of a dithiol or mixture thereof, as discussed in detail below.

In an alternative embodiment of the foregoing polythioether, when m=1 and R$^2$=n-butylene in formula II, R$^1$ is not ethylene or n-propylene. Also preferably, when m=1, p=2, q=2, r=2 and R$^2$=ethylene, X is not O.

Although not preferred, polythioethers according to the invention can also include difunctional vinyl-terminated polythioethers. That is, in formula II, y=1 and R$^4$ is —CH=CH$_2$. These polymers are produced, for example, by reacting a dithiol or mixture thereof with an excess of a divinyl ether or mixture thereof, as discussed in detail below. Analogous capped polythioethers include terminal —(CH$_2$—)$_2$—S—R$^5$.

Preferably, the mercapto-terminated polymers are essentially free of sulfone, ester or disulfide linkages, and more preferably free of such linkages. The absence of these linkages can provide good fuel and temperature resistance and good hydrolytic stability. As used herein, "essentially free of sulfone, ester or disulfide linkages" means that less than 2 mole percent of the linkages in the mercapto-terminated polymer are sulfone, ester or disulfide linkages. Disulfide linkages are particularly susceptible to thermal degradation, sulfone linkages are particularly susceptible to hydrolytic degradation.

Mercapto-terminated polymers useful in the formulations of the present invention have a mercapto functionality of at least 2. Polyfunctional analogs of the foregoing difunctional mercapto-terminated polymers can be prepared by reacting one or more compounds of formula IV and one or more compounds of formula V, in appropriate amounts, with one or more polyfunctionalizing agents.

The term "polyfunctionalizing agent" as employed herein denotes a compound having more than two moieties that are reactive with —SH and/or —CH=CH$_2$ groups. The polyfunctionalizing agent preferably includes from 3 to 6 such moieties, and thus is denoted a "z-valent" polyfunctionalizing agent, where z is the number (preferably from 3 to 6) of such moieties included in the agent, and hence the number of separate branches which the polyfunctional mercapto-terminated polymer comprises.

The polyfunctionalizing agent can be represented by the formula

where R$^8$ denotes a moiety or several moieties that are reactive with —SH or —CH=CH$_2$ groups, and B is the z-valent residue of the polyfunctionalizing agent, i.e., the portion of the agent other than the reactive moieties R$^8$.

Polyfunctional mercapto-terminated polymers according to the present invention thus preferably have the formula:

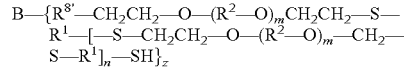

or

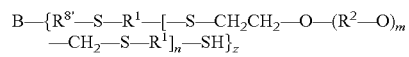

wherein
B denotes a z-valent residue of a polyfunctionalizing agent,
R$^1$, R$^2$, n and m denote structures and values discussed above with reference to Formula I,
R$^8$ denotes a moiety which is reactive with a terminal vinyl group or mercapto group, and
z is an integer from 3 to 6.

Polyfunctional polythioethers according to the present invention can preferably have the formula (III):

B—(A-[R$^3$]y—R$^4$)$_z$ (III)

wherein
A denotes a structure having the formula I,
Y is 0 or 1,
R$^3$ denotes a single bond when y=0 and —S—(CH$_2$)$_2$—[—O—R$^2$—]$_m$—O— when y=1,
R$^4$ denotes —SH or —S—(—CH$_2$—)$_2$—S—O—R$^5$ when y=O and —CH=CH$_2$ or —(CH$_2$—)$_2$—S—R$^5$ when y=1,
R$^5$ denotes $C_{1-6}$ alkyl that is unsubstituted or substituted with at least one —OH or —NHR$^7$ group,
R$^7$ denotes H or a $C_{1-6}$ n-alkyl group,
s is an integer from 0 to 10,
z is an integer from 3 to 6, and
B denotes a z-valent residue of a polyfunctionalizing agent.

As with the preceding difunctional embodiments, the foregoing polyfunctional polythioethers of the present invention optionally include terminal —SH or —CH=CH$_2$ groups, or are capped and thus include terminal —S—(—CH$_2$—)$_2$—S—O—R$^5$ or —(CH$_2$—)$_2$—S—R$^5$ groups. Partially capped polyfunctional polymers, i.e., polymers in which some but not all of the branches are capped, are also within the scope of the present invention.

Specific polyfunctionalizing agents include trifunctionalizing agents, that is, compounds with z=3. Preferred trifunctionalizing agents include triallylcyanurate (TAC), which is reactive with dithiol, and 1,2,3-propanetrithiol, which is reactive with polyvinyl ether. Agents having mixed functionality, i.e., agents that include moieties which are typically separate moieties that react with both thiol and vinyl groups, can also be employed.

Other useful polyfunctionalizing agents include trimethylolpropane trivinyl ether, and the polythiols described in U.S. Pat. Nos. 4,366,307; 4,609,762 and 5,225,472, the disclosures of each of which are incorporated in their entireties herein by reference. Mixtures of polyfunctionalizing agents can also be used.

Polyfunctionalizing agents having more than three reactive moieties (i.e., z>3) afford "star" polymers and hyperbranched polymers. For example, two moles of TAC can be reacted with one mole of a dithiol to afford a material having an average functionality of 4. This material can then be reacted with a diene and a dithiol to yield a polymer, which can in turn be mixed with a trifunctionalizing agent to afford a polymer blend having an average functionality between 3 and 4.

Inventive polymers as described above have a wide range of average functionality. For example, trifunctionalizing agents afford average functionalities from about 2.05 to 3.0, preferably about 2.1 to 2.6. Wider ranges of average functionality can be achieved by using tetrafunctional or higher polyfunctionalizing agents. Functionality will also be affected by factors such as stoichiometry, as is known to those skilled in the art.

It is contemplated that other functional groups may be employed as a substitute for the thiol groups discussed herein to react with the curing agent in order to form the polyfunctional material of the present invention. These functional groups include, for example, hydroxyl functional groups and amine groups. These thiol substitutes may be employed in the reaction chemistry by one of ordinary skill in the art of sealant formation based upon the examples and methodology discussed herein.

Thus, according to one method for making polyfunctional polymers of the present invention, (n+1) moles of a compound or compounds having the formula IV, (n) moles of a compound or compounds having the formula V, and a z-valent polyfunctionalizing agent in an amount sufficient to obtain a predetermined molecular weight and functionality, are combined to form a reaction mixture. The mixture is then reacted in the presence of a suitable catalyst as described above to afford mercapto-terminated polyfunctional polymers. Capped analogs of the foregoing mercapto-terminated polyfunctional polymers are prepared by inclusion in the starting reaction mixture of about 0.05 to about (z) moles one or more appropriate capping compounds VI. Use of (z) moles affords fully capped polyfunctional polymers, while use of lesser amounts again yields partially capped polymers.

The inventive polymers preferably are prepared by combining at least one compound of formula IV and at least one compound of formula V, optionally together with one or more capping compounds VI and/or VII as appropriate, and/or a polyfunctionalizing agent, followed by addition of an appropriate catalyst, and carrying out the reaction at a temperature from about 50 to about 120° C. for a time from about 2 to about 24 hours. Preferably, the reaction is carried out at a temperature from about 70 to about 90° C. for a time from about 2 to about 6 hours.

Since the inventive reaction is an addition reaction, rather than a condensation reaction, the reaction typically proceeds substantially to completion, i.e., the inventive mercapto-terminated polymers are produced in yields of approximately 100%. No or substantially no undesirable by-products are produced. In particular, the reaction does not produce appreciable amounts of malodorous cyclic by-products such as are characteristic of several known methods for producing polythioethers. Moreover, the polymers prepared according to the invention are substantially free of residual catalyst.

Methods of making the foregoing polyfunctional inventive polymers are discussed in detail below.

Preferably, the mercapto-terminated polymer has a viscosity of less than about 500 poise at a temperature of about 25° C. and a pressure of about 760 mm Hg determined according to ASTM D-2849 § 79-90 using a Brookfield viscometer.

The mercapto-terminated polymer or combination of mercapto-terminated polymers as detailed herein preferably is present in the polymerizable sealant composition in an amount from about 30 wt % to about 90 wt %, more preferably about 4.0 to about 80 wt %, very preferably about 45 to about 75 wt %, with the wt % being calculated based on the weight of total solids of the composition.

The sealant or potting formulations of the present invention further comprise one or more curing agents, such as polyolefins, polyacrylates, metal oxides, polyepoxides and mixtures thereof as appropriate. Curing agents useful in polymerizable sealant compositions of the invention include polyepoxides or epoxy functional resins, for example, hydantoin diepoxide, bisphenol-A epoxides, bisphenol-F epoxides, novolac type epoxides, aliphatic polyepoxides, and any of the epoxidized unsaturated and phenolic resins. Other useful curing agents include unsaturated compounds such as acrylic and methacrylic esters of commercially available polyols, unsaturated synthetic or naturally occurring resin compounds, TAC, and olefinic terminated derivatives of the compounds of the present invention. In addition, useful cures can be obtained through oxidative coupling of the thiol groups using organic and inorganic peroxides (e.g., $MnO_2$) known to those skilled in the art. Selection of the particular curing agent may affect the $T_g$ of the cured composition. For example, curing agents that have a $T_g$ significantly lower than the $T_g$ of the polythioether may lower the $T_g$ of the cured composition.

Depending on the nature of the mercapto-terminated polymer(s) used in the composition, the composition can comprise about 90% to about 150% of the stoichiometric amount of the selected curing agent(s) based upon —SH equivalents, preferably about 95 to about 125%.

Fillers useful in the polymerizable compositions of the invention for aerospace application include those commonly used in the art, such as carbon black and calcium carbonate ($CaCO_3$). Potting compound fillers illustratively include high band gap materials such as zinc sulfide and inorganic barium compounds. Preferably, the compositions include about 10 to about 70 wt % of the selected filler or combination of fillers, more preferably about 10 to 50 wt % based upon the total weight of the composition.

The sealant and potting compositions of the present invention can comprise one or more adhesion promoters. Suitable adhesion promoters include phenolics such as METHYLON phenolic resin available from Occidental Chemicals, organosilanes such as epoxy, mercapto or amino functional silanes such as A-187 and A-1100 available from OSi Specialities. Preferably, an adhesion promoter is employed in an amount from 0.1 to 15 wt % based upon total weight of the formulation.

Common substrates to which the sealant compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates.

Preferably, a plasticizer is present in the sealant formulation in an amount ranging from 1 to 8 weight percent based upon total weight of the formulation. Plasticizers that are useful in polymerizable compositions of the invention include phthalate esters, chlorinated paraffins, hydrogenated terphenyls, etc.

The formulation can further comprise one or more organic solvents, such as isopropyl alcohol, in an amount ranging from 0 to 15 percent by weight on a basis of total weight of the formulation, preferably less than 15 weight percent and more preferably less than 10 weight percent.

A typical sealant formulation is provided in Example 18.

Polymerizable sealant composition cure time is reduced considerably by using an organic amine catalyst having a pKb of 10 or above. Preferred organic amine catalysts are organic tertiary amines. Specific catalysts which are useful in the present invention are triethylene diamine, diazabicyclo (2,2, 2) octane (DABCO) (preferred), diazabicycloundecene (DBU), 2,4,6-tri(dimethylamino methyl) phenol (DMP-30) and tetramethyl guanidine (TMG). The reaction time when utilizing the organic amine catalysts, and particularly the organic tertiary amine catalysts, is in general between about one hour to about 20 hours which is a considerable difference compared to using no amine catalyst.

Generally the amount of catalyst ranges from 0.05 wt % to 3 wt %, based on the total weight of the starting reactants.

The foregoing sealant or potting formulations preferably are cured at ambient temperature and pressure, however the formulations generally can be cured at a temperature ranging from about 0° C. to about 100° C.

In addition to the foregoing ingredients, polymerizable sealant compositions of the invention can optionally include one or more of the following: pigments; thixotropes; retardants; and masking agents.

Useful pigments include those conventional in the art, such as carbon black and metal oxides. Pigments preferably are present in an amount from about 0.1 to about 10 wt % based upon total weight of the formulation.

Thixotropes, for example fumed silica or carbon black, are preferably used in an amount from about 0.1 to about 5 wt % based upon total weight of the formulation.

An additional advantage of sealant formulations according to the invention is their improved curing behavior. The extent of cure of a sealant formulation as a function of time is often difficult to measure directly, but can be estimated by determining the extrusion rate of the composition as a function of time. The extrusion rate is the rate at which a mixed sealant formulation, i.e., a sealant formulation together with an accelerator system, is extruded from an applicator device. As the sealant formulation is mixed with the accelerator system, curing begins, and the extrusion rate changes with time. The extrusion rate thus is inversely related to the extent of cure. When the extent of cure is low, the viscosity of the mixed ungelled sealant formulation is low and thus the extrusion rate is high. When the reaction approaches completion, the viscosity becomes very high, and the extrusion rate thus becomes low. The extrusion rate can be measured according to AMS Method 3276 (section 4.5.10), which is incorporated herein by reference.

With reference to FIG. 1, the viscosity of some known types of sealant formulations remains low for an extended time, because the compositions are slow to cure. Such formulations have extrusion curves qualitatively similar to curve A. Other known types of sealant formulations cure very quickly, and thus their viscosity rapidly increases. Consequently, the extrusion rate rapidly decreases, as shown in curve B. Desirably, a mixed sealant formulation should have a low viscosity, and thus a high extrusion rate, for a length of time sufficient to allow even application of the sealant formulation to the area requiring sealing, but then should cure rapidly after application, i.e., their extrusion rate should quickly decrease. Sealant formulations according to the present invention are characterized by this desirable extrusion curve, as illustrated qualitatively in curve C.

Sealant formulations according to the present invention can have, depending on the particular formulation, initial extrusion rates as high as 500 g/min or higher, together with low extrusion rates on the order of about 5 to 10 g/min or less after curing times on the order of one hour.

Figure 2:
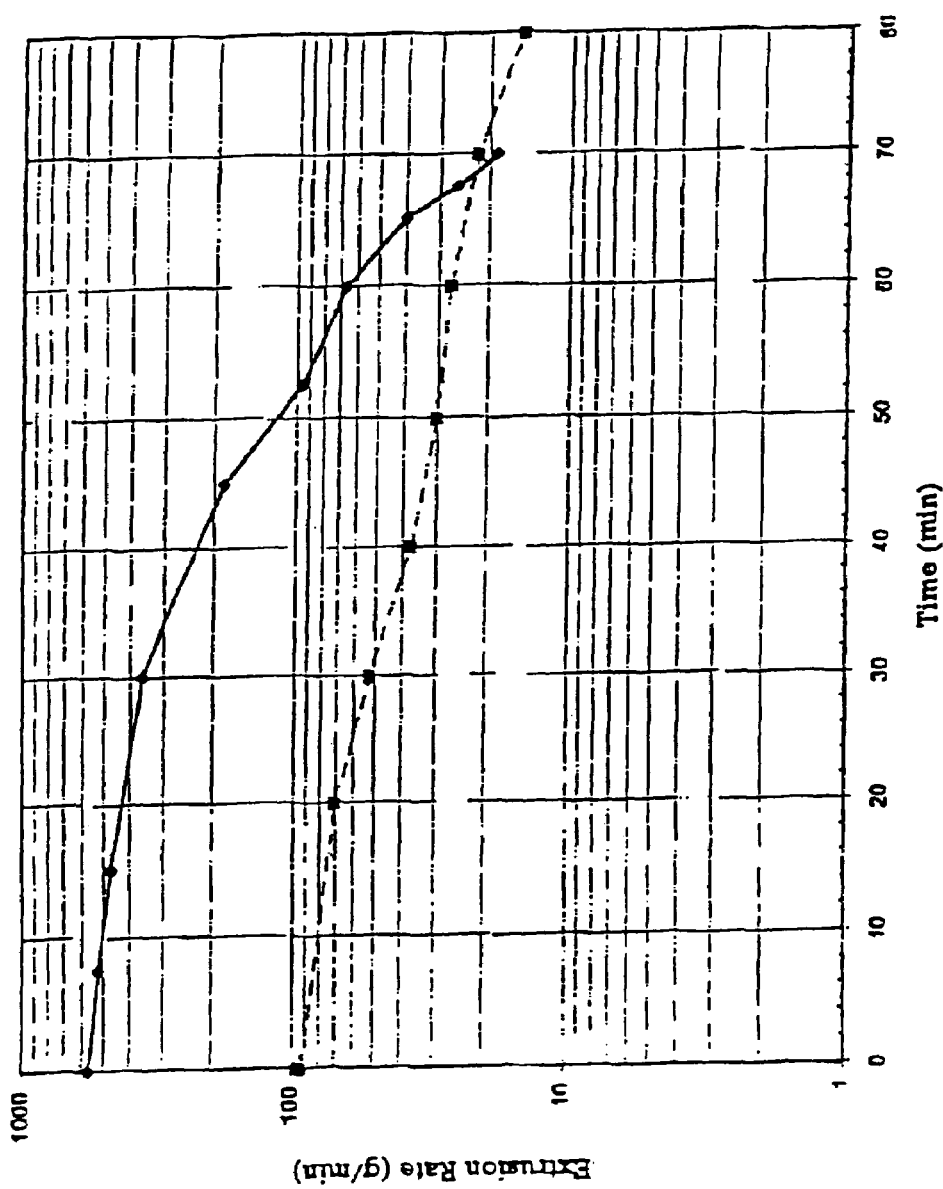
FIG. 2 is a semi-log graph of the extrusion rate curve of a polythioether sealant composition of the invention (♦) and a prior art polysulfide sealant composition (■).

As shown in FIG. 2, the initial extrusion rate of a sealant containing a polymer of the present invention (Example 1, below, cured with an epoxy curing agent as described below) is about 550 g/min, then falls rapidly to about 20 g/min after 70 minutes. In comparison, a known polysulfide polymer based sealant (cured with $MnO_2$) has an initial extrusion rate of about 90 g/min, which slowly falls to about 20 g/min after 70 minutes.

Another preferred curable sealant formulation combines one or more plasticizers with the mercapto-terminated polymer(s), curing agent(s) and filler(s) described above. Use of a plasticizer allows the polymerizable formulation to include mercapto-terminated polymers which have higher $T_g$ than would ordinarily be useful in an aerospace sealant or potting compound, i.e., use of a plasticizer effectively reduces the $T_g$ of the formulation, and thus increases the low-temperature flexibility of the cured polymerizable formulation beyond that which would be expected on the basis of the $T_g$ of the mercapto-terminated polymers alone.

The present invention is illustrated in more detail by means of the following non-limiting examples which are presently representative of preferred embodiments. These examples are exemplary and are not intended as a limitation on the scope of the invention as detailed in the appended claims.

EXAMPLES

In Examples 1-8, liquid polythioethers were prepared by stirring together one or more dithiols with one or more divinyl ethers and a trifunctionalizing agent. The reaction mixture was then heated and a free radical catalyst was added. All reactions proceeded substantially to completion (approximately 100% yield).

Example 1

In a 2 L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of an azobisnitrile free radical catalyst (VAZO® 67 [2,2'-azobis(2-methylbutyronitrile), commercially available from DuPont). The reaction proceeded substantially to completion after 2 hours to afford 1250 g (0.39 mol, yield 100%) of a liquid polythioether resin having a $T_g$ of −68° C. and a viscosity of 65 poise and a number average molecular weight of about 3165 grams per mole and a thiol functionality of 2.2. The polymer was faintly yellow and had low odor.

Example 2

In a 1 L flask, 404.4 9 (1.60 mol) of PLURIOL® E-200 divinyl ether and 355.88 g (1.94 mol) of DMDO were mixed with 12.1 g (0.049 mol) of TAC and reacted as in Example 1. The reaction proceeded substantially to completion after 5 hours to afford 772 g (0.024 mol, yield 100%) of a resin having a $T_g$ of −66° C. and a viscosity of 48 poise. The polymer was yellow and had low odor.

Example 3

In a 100 mL flask, 33.2 9 (0.21 mol) of DEG-DVE and 26.48 g (0.244 mol) of 1,2-propanedithiol were mixed with 0.75 g (0.003 mol) of TAC and heated to 71° C. To the heated reaction mixture was added 0.15 g (0.8 mmol) of VAZO® 67. The reaction proceeded substantially to completion after 7 hours to afford 60 g (0.03 mol, yield 100%) of a resin having a $T_g$ of −61° C. and a viscosity of 22 poise. The polymer had a noticeable PDT (propane dithiol) odor.

Example 4

In a 100 mL flask, 33.3 g (0.136 mol) of tripropylene glycol divinyl ether (DPE-3) and 27.0 g (0.170 mol) of dimercaptodiethylsulfide (DMDS) were mixed with 0.69 g (0.003 mol) of TAC and heated to 77° C. To the heated reaction mixture was added 0.15 g (0.8 mmol) of VAZO® 67. The reaction proceeded substantially to completion after 6 hours to afford 61 g (0.028 mol, yield 100%) of a polymer having a $T_g$ of −63° C. and a viscosity of 26 poise.

Example 5

In a 250 mL flask, 113.01 g (0.447 mol) of PLURIOL® E-200 divinyl ether and 91.43 g (0.498 mol) of DMDO were mixed with 1.83 g (0.013 mol) of 1,2,3-propanetrithiol (PTT) and allowed to react exothermically for 72 hours. The mixture was then heated to 80° C. To the heated reaction mixture was added 0.2 g (1 mmol) of VAZO® 67. The reaction mixture was maintained at 80° C., and the reaction proceeded substantially to completion after 3 hours to afford 200 g (0.06 mol, yield 100%) of a polymer having a $T_g$ of −66° C. and a viscosity of 55 poise.

Example 6

In a small jar, 14.0 g (0.055 mol) of PLURIOL® E-200 divinyl ether, 6.16 g (0.0336 mol) of DMDO and 5.38 g (0.0336 mol) of DMDS were mixed with 0.42 g (0.017 mol) of TAC (briefly heated to melt the TAC) and heated to 82° C. To the heated reaction mixture was added 0.2 g (0.001 mol) of VAZO® 67. The reaction proceeded substantially to completion after 18 hours to afford 26 g (8.4 mmol, yield 100%) of a polymer having a $T_g$ of −63° C. and a viscosity of 80 poise.

Example 7

In a small jar, 13.55 g (0.054 mol) of PLURIOL.® E-200 divinyl ether, 10.44 g (0.057 mol) of DMDO and 1.44 g (8.1 mmol) of ethylcyclohexanedithiol (ECHDT) were mixed with 0.40 g (1.6 mmol) of TAC (heated briefly to melt the TAC) and heated to 82° C. To the heated reaction mixture was added 0.2 g (0.001 mol) of VAZO® 67. The reaction proceeded substantially to completion after 5 hours to afford 26 g (8.1 mmol, yield 100%) of a polymer having a $T_g$ of −66° C. and a viscosity of 58 poise.

Example 8

In a small glass jar, 9.11 g (0.036 mol) of PLURIOL® E-200 divinyl ether, 5.71 g (0.031 mol) of DMDO, 1.52 g (7.8 mmol) of ECHDT, 5.08 g (0.031 mol) of DMDS and 4.11 g (0.024 mol) of hexanediol divinyl ether (HD-DVE) were mixed with 0.39 g (1.6 mmol) of TAC (heated briefly to dissolve the TAC) and heated to 82° C. To the heated reaction mixture was added 0.6 g (3.1 mmol) of VAZO® 67. The reaction proceeded substantially to completion after about 45 hours to afford 2.6 g (7.8 mmol, yield 100%) of a polymer having a $T_g$ of −66° C. and a viscosity of 304 poise. The polymer had a cloudy appearance.

Each of the foregoing polymers was evaluated for odor. The following scale was employed: 3: strong, offensive odor; 2: moderate odor; 1: slight odor; 0: substantially odorless.

The polymer described in Example 3 of U.S. Pat. No. 4,366,307 was used as a control. This polymer (the "control polymer") had an odor of 3.

Results were as follows:

| Polymer | Odor |
|---|---|
| 1 | 1 |
| 2 | 1 |
| 3 | 3 |
| 4 | 1 |
| 5 | 1 |
| 6 | 1 |
| 7 | 1 |
| 8 | 2 |

All of the liquid polythioethers thus had little or moderate odor except polymer 3, which had a strong odor.

The polymers prepared in Examples 1-8 were then cured. Curing was carried out using the uncompounded resins with a curing agent and DABCO accelerator. The curing agent had the following composition:

| | |
|---|---|
| epoxy novolac[1] (equivalent weight 175.5) | 22 wt % |
| hydantoin epoxy[2] (equivalent weight 132) | 34 wt % |
| calcium carbonate | 34 wt % |
| carbon black | 5 wt % |
| silane adhesive promoter | 5 wt % |

[1]DEN-431 epoxy novolac available from Dow Chemical of Midland, Michigan.
[2]ARACAST XU A4 238 hydantoin epoxy available from Ciba-Geigy.

The cured resins were evaluated for odor according to the procedure set forth above. The $T_g$ and the percent weight gain after immersion in JRF type 1 for one week at room temperature and pressure were also measured for each of the cured resins. The volume swell and weight gain percentages were determined for each cured material as follows:
$w_1$=initial weight in air
$w_2$=initial weight in $H_2O$
$w_3$=final weight in air
$w_4$=final weight in $H_2O$
% volume swell=$100 \times [(w_2+w_3)-(w_1+w_4)]/(w_1-w_2)$
% weight gain=$100 \times (w_3-w_1)/w_1$
The results are given in Table 1:

TABLE 1

| Cured Resin | 1 | 2 | 3 | 4 | 5 | 6 | 7 | 8 |
|---|---|---|---|---|---|---|---|---|
| Odor | 0 | 0 | 0 | 0 | 0 | 0 | 0 | 0 |
| $T_g$ (° C.) | −59 | −61 | −61 | −63 | −62 | −56 | −59 | −58 |
| % fuel swell | 19 | 22 | — | — | 23 | 19 | 24 | 27 |
| % wt. Gain | 14 | 15 | 15 | 23 | 15 | 15 | 19 | 20 |

In comparison, the control polymer had an odor of 1-2 when cured.

Example 9

Polythioethers having a number average molecular weight of 2100 and an average SH functionality F of 2.1 were prepared by combining a divinyl ether with a dithiol as shown in Table 2 and reacting the materials as previously described herein. The uncompounded polythioethers were then cured using 15 g of the curing agent described above and 0.30 g of DABCO. For each polythioether so prepared, the following quantities were measured: viscosity (uncured material, poise p); Shore A hardness (cured material, Rex durometer value); % weight gain (cured material) after one week at 140° F. (60° C.) and atmospheric pressure in JRF type 1; and $T_g$ (cured material, ° C.). Results were as follows:

TABLE 2

| Dithiol Divinyl Ether | ECHDT | DMDS | DMDO | HDT[d] |
|---|---|---|---|---|
| DEG-DVE | 145 p | (solid) | 27 p | 24 p |
|  | 44 Rex | 94 Rex | 25 Rex | 25 Rex |
|  | 27% | 3% | 14% | 29% |
|  | −53 | −63 | −69 | −77 |
| PLURIOL ®[a] | 77 p | 41 p | 59 p | 25 p |
|  | 43 Rex | 47 Rex | 27 Rex | 23 Rex |
|  | 27% | 11% | 18% | 30% |
|  | −57 | −61 | −67 | −76 |
| BD-DVE[b] | 185 p | (solid) | (solid) | (solid) |
|  | 42 Rex | — | 20 Rex | 22 Rex |
|  | 44% | — | 21% | 44% |
|  | −59 | — | −79 | −85 |
| HD-DVE | 155 p | (solid) | (solid) | (soft solid) |
|  | 50 Rex | — | 14 Rex | 29 Rex |
|  | 57% | — | 27% | 68% |
|  | −60 | −63 | −78 | −86 |
| Poly-THF[c] | 91 p | (solid) | 27 p | — |
|  | 30 Rex | 75 Rex | 17 Rex | — |
|  | 64% | 29% | 37% | — |
|  | −69 | −79 | −79 | — |

[a]PLURIOL ® E200 divinyl ether
[b]Butanediol divinyl ether
[c]polytetrahydrofuran divinyl ether
[d]Hexanedithiol From the foregoing table it is apparent that the following combinations of divinyl ether and dithiol afford liquid polythioethers having good fuel resistance and low temperature flexibility when cured: PLURIOL® E-200/DMDO; and DEG-DVE/DMDO. Other potentially useful combinations include DEG-DVE/ECHDT; DEG-DVE/HDT; PLURIOL® E-200/ECHDT; PLURIOL® E-200/HDT; and poly-THF/DMDO. PLURIOL® E-200/DMDS also has excellent fuel resistance and low temperature flexibility when cured, but the uncompounded material does not remain in a liquid state for an extended period of time.

Example 10

Addition of DMDS to PLURIOL®/DMDO Polymers

Four liquid polythiol ether polymers were prepared as previously described herein. The polymers had the following compositions (listed values are molar equivalents):

|  | 1 | 2 | 3 | 4 |
|---|---|---|---|---|
| PLURIOL ® E-200 | 6.6 | 6.6 | 6.6 | 6.6 |
| DMDO | 8 | 6 | 4.5 | 4 |
| DMDS | 0 | 2 | 3.5 | 4 |

To each of these polymers was added 0.2 molar equivalents of TAC to afford a number average molecular weight of about 3000 and a SH functionality F of 2.2. Each resultant uncompounded polymer was cured as in Example 9 (15 g of the curing agent composition and 0.30 g of DABCO). For each polymer, the following properties were measured: $T_g$ (resin, ° C.); $T_g$ (cured, ° C.); viscosity (p); % swell in JRF type 1; % weight gain in JRF type 1; and % weight gain in water. Results are given in Table 3.

TABLE 3

|  | 1 | 2 | 3 | 4 |
|---|---|---|---|---|
| $T_g$ (resin) | −67 | −66 | −64 | −63 |
| (cured) | −59 | −58 | −56 | −56 |
| Viscosity | 59 | 53 | 62 | 80 |
| JRF |  |  |  |  |
| % Swell | 24 | 21 | 21 | 20 |
| % Wt Gain | 18 | 15 | 16 | 16 |
| $H_2O$ |  |  |  |  |
| % Wt Gain | 11.8 | 11.5 | 7.4 | 7.5 |

All of the foregoing polymers displayed excellent fuel resistance. Polymers 1 and 2 in particular also displayed excellent low temperature flexibility when tested according to AMS 3267 § 4.5.4.7.

Example 11

Addition of ECHDT to PLURIOL®/DMDO Polymers

Four liquid polythiol ether polymers were prepared as previously described herein. The polymers had the following compositions (listed values are molar equivalents):

|  | 1 | 2 | 3 | 4 |
|---|---|---|---|---|
| PLURIOL ® E-200 | 6.6 | 6.6 | 6.6 | 6.6 |
| DMDO | 8 | 7 | 6 | 5 |
| ECHDT | 0 | 1 | 2 | 3 |

Each of these polymers had a number average molecular weight of about 3000 and a SH functionality F of 2.2. Each resultant uncompounded polymer was cured as in Example 10. For each polymer, the following properties were measured: $T_g$ (resin, ° C.); $T_g$ (cured, ° C); viscosity (p); % swell in JRF type 1; % weight gain in JRF type 1; and % weight gain in water. Results are given in Table 4.

TABLE 4

|  | 1 | 2 | 3 | 4 |
|---|---|---|---|---|
| $T_g$ (resin) | −67 | −66 | −65 | −64 |
| (cured) | −59 | −59 | −58 | −56 |
| Viscosity | 59 | 36 | 44 | 50 |
| JRF type 1 |  |  |  |  |
| % Swell | 24 | 21 | 28 | 29 |
| % Wt Gain | 18 | 18 | 19 | 19 |
| $H_2O$ |  |  |  |  |
| % Wt Gain | 11.8 | 10.8 | 8.3 | 7.8 |

All of the foregoing polymers displayed good fuel resistance and low temperature flexibility.

Example 12

In a 250 mL 3-neck flask equipped with a stirrer, thermometer and condenser, 87.7 g (0.554 mol) of DEG-DVE and 112.3 g (0.616 mol) of DMDO are mixed and heated to 77° C. (about 170° F.). To the mixture is added 0.8 g (4.2 mmol) of VAZO® 67 catalyst. The reaction mixture is reacted at 82° C. (about 180° F.) for about 6 hours to afford 200 g (0.06 mol, yield 100%) of a low viscosity liquid polythioether resin having a thiol equivalent weight of 1625 and a SH functionality F of 2.0.

Example 13

In a 250 mL 3-neck flask equipped with a stirrer, thermometer and condenser, 26.7 g (0.107 mol) of TAC, 56.4 g (0.357 mol) of DEG-DVE and 117.0 g (0.642 mol) of DMDO are mixed and heated to 77° C. (about 170° F.). To the mixture is added 0.8 g (4.2 mmol) of VAZO 67 catalyst. The reaction mixture is reacted at 82° C. (about 180° F.) for about 6 hours to afford 200 g (0.07 mol, yield 100%) of a high viscosity liquid polythioether resin having an equivalent weight of 800 and a SH functionality F of about 3.5.

Example 14

Sealant Composition

A sealant composition including the DMDO/DEG-DVE polythioether polymer of Example 1 was compounded as follows (amounts in parts by weight):

| | |
|---|---|
| DMDO/DEG-DVE Polythioether | 100 |
| Calcium carbonate | 60 |
| Magnesium oxide | 1 |
| Phenolic resin[3] | 1 |
| DMP-30 | 1 |
| Isopropyl alcohol | 3 |

[3]METHYLON 75108 phenolic resin available from Occidental Chemical.

The compounded polymer was mixed intimately with the epoxy resin curing agent of Examples 9-11 above, in the weight ratio of 10:1 and cured at ambient temperature and humidity. Tensile strength and elongation were evaluated according to ASTM 3269 and AMS 3276. The die used to prepare the test samples is described in ASTM D 412. The die used to prepare test samples for tear strength testing is described in ASTM D1004. The following physical properties were obtained for the cured composition:

| | |
|---|---|
| Cure hardness at 25° C. | 60 Shore A |
| Tensile strength at break | 550 psi |
| Elongation at break | 600% |
| Notched tear strength | 100 p/i |
| Low-temperature flexibility (AMS 3267 §4.5.4.7) | Passed |

Example 15

Sealant Composition

A sealant composition including the ECHDT/DEG-DVE polythioether polymer of Example 9 was compounded as follows (amounts in parts by weight):

| | |
|---|---|
| ECHDT/DEG-DVE Polythioether | 100 |
| Calcium carbonate | 54 |
| Hydrated aluminum oxide | 20 |
| Magnesium oxide | 1 |
| Phenolic resin of Example 14 | 1 |
| Hydrogenated terphenyl plasticizer | 6 |
| DMP-30 | 1 |
| Isopropyl alcohol | 3 |

The compounded polymer was mixed intimately with an epoxy resin curing agent of Examples 9-12 above in the weight ratio of 10:1 and cured at ambient temperature and humidity. The following physical properties were obtained for the cured composition:

| | |
|---|---|
| Cure hardness at 25° C. | 72 Shore A |
| Tensile strength at break | 550 psi |
| Elongation at break | 450% |
| Notched tear strength | 85 p/i |
| Low-temperature flexibility | Passed |

Example 16

OH-Terminated Capped Polythioether

In a 500 ml flask, 275.9 g (1.09 mol) PLURIOL® E-200 divinyl ether, 174.7 g (0.95 mol) DMDO, 28.7 g (0.30 mol) 3-mercaptopropanol and 1.83 g (7.3 mmol) TAC were mixed. The mixture was heated to 70° C., and 2.3 g (12 mmol) VAZO® 67 were added slowly. The reaction mixture was stirred and heated at 85-90° C. for 4 hours to afford 480 g (0.15 mol, yield 100%) of a polymer having an OH equivalent weight of 1670 (number average molecular weight=3200, OH functionality F=2.05).

Example 17

OH-Terminated Capped Polythioether

In a 250 ml flask, 104.72 g (0.57 mol) DMDO, 80.73 g (0.51 mol) DEG-DVE and 14.96 g (0.13 mol) butanediol monovinyl ether were mixed and heated to 75° C. To the heated mixture 0.60 g (3 mmol) VAZO® 67 were added slowly. The reaction mixture was stirred and heated at 75-85° C. for 6 hours to afford 200 g (0.064 mol, yield 100%) of a clear, nearly colorless polymer with very low odor and a viscosity of 79 poise at 20° C. The OH equivalent weight was 1570 (number average molecular weight=3200, OH functionality F=2.00).

Example 18

Sealant Composition

A sealant composition including the DMDO/DEG-DVE polythioether polymer of Example 1 was compounded as follows (amounts in weight percent):

Base Composition:

| Wt. % | Component |
|---|---|
| 0.277 | Tung oil |
| 1.053 | triethylene diamine, diazabicyclo (2,2,2) octane[4] |
| 55.466 | Polythioether polymer of Example 1 |
| 0.831 | Phenolic resin adhesion promoter[5] |
| 0.554 | Phenolic/polysulfide adhesion promoter[6] |
| 0.277 | Titanate[7] |
| 1.108 | Amino functional silane[8] |
| 0.222 | Fumed silica |
| 0.554 | Titanium dioxide |
| 0.831 | Amorphous silica |

-continued

| Wt. % | Component |
|---|---|
| 8.320 | Aluminum hydroxide |
| 30.506 | precipitated calcium carbonate |

[4]DABCO triethyl amine, diazabicyclo (2,2,2) octane available from Air Products & Chemicals.
[5]METHYLON 75108 phenolic resin available from Occidental Chemical.
[6]The phenolic/polysulfide adhesion promoter was prepared by reacting about 31% VARCUM 29202 phenolic resin, 66% Thiokol LP-3 polysulfide and 3% of a polymer prepared according to Example 4 of U.S. Pat. No. 4,623,711 (at a ratio of 1 mole dithiol to 1 mole polysulfide) (incorporated by reference herein) at a temperature of about 150° F. (65° C.) for 45 mins, then heated to 230° F. (110° C.) over a 45-60 minute period, then heated at 230° F. (110° C.) for 165 mins.
[7]TYZOR TBT titanate available from E.I. duPont de Nemours Company.
[8]A-1100 amino functional silane available from OSi Specialities, Inc.

Accelerator:

| Wt. % | Component |
|---|---|
| 26.525 | Bisphenol A diglycidyl ether[9] |
| 17.684 | Epoxy novolac[10] |
| 10.699 | Plasticizer[11] |
| 42.440 | Calcium carbonate |
| 0.221 | Carbon black |
| 0.088 | Carbamate salt[12] |
| 2.247 | Epoxy functional silane[13] |
| 0.085 | Deionized water |
| 0.011 | Diphenylguanidine |

[9]EPON 828 bisphenol A diglycidyl ether available from Shell Chemical.
[10]DEN 431 epoxy novolac available from Dow Chemical.
[11]HB-40 plasticizer available from Monsanto Co.
[12]Ferbam 76% WDG carbamate salt available from Cabot Corp.
[13]A-187 epoxy functional silane available from OSi Specialities, Inc.

Each of the components of the Base Composition was mixed sequentially in the order listed. In a separate container, each of the components of the Accelerator was mixed sequentially in the order listed. A sealant formulation according to the present invention was prepared by mixing 100 grams of the Base Composition with 18.5 grams of the Accelerator.

The compositions of the present invention are useful in aerospace applications such as aerospace sealants and linings for fuel tanks; and as electrical potting or encapsulant compounds. An aerospace sealant material according to the present invention can exhibit properties including extreme temperature performance, fuel resistance and flexural strength. The formulations detailed herein are well suited for use as potting compounds to encapsulate electrical and electronic components that can experience temperature extremes, chemically harsh environments and mechanical vibrations.

The foregoing description is illustrative of particular embodiments of the invention, but is not meant to be a limitation upon the practice thereof. The following claims, including all equivalents thereof, are intended to define the scope of the invention.

Therefore, we claim:

1. A polythioether comprising:

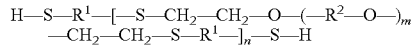

wherein
$R^1$ is selected from the group consisting of $C_{2-6}$ n-alkylene, and a —[(—$CH_2$—)$_p$—X]$_q$—(—$CH_2$—)$_r$— group;
$R^2$ is selected from the group consisting of $C_{2-6}$ n-alkylene, and $C_{6-8}$ cycloalkylene;
X is selected from the group consisting of O and S;
m is an integer between 0 and 10;
p is an integer between 2 and 6;
q is an integer between 1 and 5;
r is an integer between 2 and 10; and
n is an integer between 1 and 60 selected so that the molecular weight of the polythioether is between 1,000 and 10,000 Daltons.

2. The polythioether of claim 1 wherein $R^1$ is $C_2$-$C_6$ n-alkylene.

3. The polythioether of claim 1 where $R^1$ is —[(—$CH_2$—)$_p$—O—]$_q$—(—$CH_2$—)$_r$,— where r, p, and q are 2.

4. The polythioether of claim 1 wherein $R^2$ is $C_2$ alkylene.

5. The polythioether of claim 1 wherein the molecular weight of said polythioether ranges from about 2000 to about 5000 Daltons.

6. The polythioether of claim 1 having an atomic percentage ratio of C:S:O of 35-49:20-60:0-20.

7. A mixture of polythioether polymers comprising:
a polythioether polymer having the formula

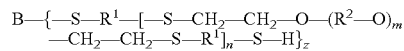

wherein
$R^1$ is selected from the group consisting of $C_{2-6}$ n-alkylene, and a —[(—$CH_2$—)$_p$—X]$_q$—(—$CH_2$—)$_r$— group;
$R^2$ is selected from the group consisting of $C_{2-6}$ n-alkylene, and $C_{6-8}$ cycloalkylene;
X is selected from the group consisting of O and S;
m is an integer between 1 and 10;
p is an integer between 2 and 6;
q is an integer between 1 and 5;
r is an integer between 2 and 10;
z is an integer from 3 to 6;
B is a z-valent group of a polyfunctionalizing agent; and
n is an integer between 1 and 60 selected so that the molecular weight of the polythioether is between 1,000 and 10,000 Daltons.

8. The polythioether mixture of claim 7 wherein z is 3.

9. The polythioether mixture of claim 7 wherein the mixture has an average functionality between 3 and 4.

10. The polythioether mixture of claim 7 wherein the average functionality is between 2.05 and 3.00.

11. A curable composition comprising:
40 to 80 weight percent of a polythioether polymer according to claim 1,
10 to 50 weight percent of a filler and 10 weight percent of a curing agent.

12. The curable composition of claim 11 further comprising one or more additives selected from the group consisting of: pigments, cure accelerators, adhesion promoters, thixotropic agents and isopropyl alcohol.

13. The polythioether of claim 1, wherein r is an integer between 2 and 6, $R^2$ is $C_{2-6}$ n-alkylene, and m, p and q are each 2.

14. The polythioether mixture of claim 7, wherein r is an integer between 2 and 6, $R^2$ is $C_{2-6}$ n-alkylene, and m, p and q are each 2.

15. A curable composition comprising: 40 to 80 weight percent of a polythioether polymer according to claim 13, 10 to 50 weight percent of a filler and 10 weight percent of a curing agent.

16. The curable composition of claim 15 which includes from about 0.1 to about 5 weight percent based upon the total weight of formulation of fumed silica.

17. The curable composition of claim 15 wherein the filler comprises carbon black.

18. The curable composition of claim 15 wherein the filler comprises calcium carbonate.

19. A curable composition comprising: 40 to 80 weight percent of a polythioether polymer according to claim 1, 10 to 50 weight percent of a filler, and 90% to about 150% of the stoichiometric amount of a curing agent based upon —SH equivalents.

20. The curable composition of claim 19 which comprises about 47 weight percent polythioether polymer, about 0.7 weight percent of amorphous silica, about 34 weight percent calcium carbonate, and about 7 weight percent curing agent, based on the total weight of the composition formulation.

* * * * *